(12) United States Patent
Nilsson et al.

(10) Patent No.: US 9,469,296 B2
(45) Date of Patent: Oct. 18, 2016

(54) MANOEUVER GENERATION FOR AUTOMATED DRIVING

(71) Applicant: VOLVO CAR CORPORATION, Gothenburg (SE)

(72) Inventors: Julia Nilsson, Gothenburg (SE); Mohammad Ali, Angered (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/478,664

(22) Filed: Sep. 5, 2014

(65) Prior Publication Data

US 2015/0073663 A1 Mar. 12, 2015

(30) Foreign Application Priority Data

Sep. 12, 2013 (EP) .................................... 13184034

(51) Int. Cl.
| | |
|---|---|
| *B60W 30/00* | (2006.01) |
| *B60W 30/08* | (2012.01) |
| *B60W 30/12* | (2006.01) |
| *B60W 50/00* | (2006.01) |
| *B60W 30/095* | (2012.01) |

(52) U.S. Cl.
CPC ............ *B60W 30/08* (2013.01); *B60W 30/095* (2013.01); *B60W 30/12* (2013.01); *B60W 50/0097* (2013.01); *B60W 50/0098* (2013.01); *B60W 2550/141* (2013.01); *Y02T 10/84* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,765,116 A | * | 6/1998 | Wilson-Jones | G05D 1/0246 180/168 |
| 7,085,637 B2 | * | 8/2006 | Breed | B60N 2/2863 340/440 |
| 8,195,386 B2 | * | 6/2012 | Hu | G01C 21/3647 345/7 |
| 8,204,680 B1 | * | 6/2012 | Dorum | G01C 21/3697 340/995.1 |
| 8,428,843 B2 | * | 4/2013 | Lee | B62D 15/025 180/282 |
| 8,520,695 B1 | * | 8/2013 | Rubin | G08G 9/02 370/337 |
| 8,630,762 B2 | * | 1/2014 | Staempfle | 340/436 |

(Continued)

FOREIGN PATENT DOCUMENTS

| | | |
|---|---|---|
| DE | 102011003345 | 8/2012 |
| EP | 2390862 | 11/2011 |
| WO | 2011009009 | 1/2011 |

OTHER PUBLICATIONS

Extended European Search Report for EP 13184034.0 Completed by the European Patent Office, Dated Feb. 24, 2014, 7 Pages.

*Primary Examiner* — Jonathan L Sample
(74) *Attorney, Agent, or Firm* — Brooks Kushman P.C.

(57) ABSTRACT

A method and arrangement are described for manoeuvre generation for automated driving on a one-way road of a vehicle (e) hosting the arrangement, the host vehicle (e) further including one or more advanced driver assistance systems. A collision free reference trajectory for longitudinal and lateral movement of the host vehicle (e) is determined repeatedly, with a fix time interval, for allowing the host vehicle (e) to retain a desired velocity and maintain the host vehicle (e) in a preferred lane utilizing model predictive control and quadratic program formulation. A control scheme where the structured environment of the one-way road is exploited in order to linearly formulate collision avoidance constraints is utilized. Manoeuvre generation is performed through solving the quadratic program. The one or more advanced driver assistance systems are controlled to perform the generated manoeuvre.

11 Claims, 11 Drawing Sheets

(56) References Cited

U.S. PATENT DOCUMENTS

| | | | | |
|---|---|---|---|---|
| 8,993,951 B2* | 3/2015 | Schofield | G05D 1/0244 | 250/208.1 |
| 2003/0150961 A1* | 8/2003 | Boelitz | B64G 1/002 | 244/158.1 |
| 2004/0193374 A1* | 9/2004 | Hac | B60K 31/0008 | 701/301 |
| 2005/0149251 A1* | 7/2005 | Donath | G01C 21/26 | 701/532 |
| 2006/0167784 A1* | 7/2006 | Hoffberg | G06Q 20/401 | 705/37 |
| 2007/0087756 A1* | 4/2007 | Hoffberg | G06Q 10/0631 | 455/450 |
| 2007/0255480 A1* | 11/2007 | Southall | B60T 7/22 | 701/96 |
| 2008/0266324 A1* | 10/2008 | Lynch | G01C 21/20 | 345/634 |
| 2008/0312830 A1* | 12/2008 | Liu | G08G 1/166 | 701/301 |
| 2008/0312833 A1* | 12/2008 | Greene | G06K 9/00805 | 701/301 |
| 2009/0157247 A1* | 6/2009 | Sjogren | G08G 1/167 | 701/23 |
| 2010/0019880 A1* | 1/2010 | Huang | G07C 5/085 | 340/5.1 |
| 2010/0152951 A1* | 6/2010 | Chin | B60W 40/09 | 701/31.4 |
| 2010/0168998 A1* | 7/2010 | Matsunaga | B60W 30/10 | 701/532 |
| 2010/0209885 A1* | 8/2010 | Chin | G09B 19/167 | 434/65 |
| 2010/0211270 A1* | 8/2010 | Chin | B62D 6/007 | 701/44 |
| 2010/0253493 A1* | 10/2010 | Szczerba | G01S 13/723 | 340/435 |
| 2010/0253598 A1* | 10/2010 | Szczerba | G01S 13/723 | 345/7 |
| 2010/0317420 A1* | 12/2010 | Hoffberg | G06Q 30/0207 | 463/1 |
| 2011/0106361 A1* | 5/2011 | Staempfle | B62D 15/0265 | 701/23 |
| 2012/0083947 A1* | 4/2012 | Anderson | B60W 30/09 | 701/3 |
| 2012/0095682 A1* | 4/2012 | Wilson | G01C 21/32 | 701/532 |
| 2012/0116678 A1* | 5/2012 | Witmer | G01C 21/32 | 702/5 |
| 2012/0143488 A1* | 6/2012 | Othmezouri | B60T 7/22 | 701/301 |
| 2012/0245756 A1* | 9/2012 | Cooprider | B60W 30/146 | 701/1 |
| 2012/0245817 A1* | 9/2012 | Cooprider | B60W 50/14 | 701/70 |
| 2012/0330540 A1* | 12/2012 | Ozaki | G06Q 10/047 | 701/117 |
| 2013/0275033 A1* | 10/2013 | Bastiaensen | G01C 21/26 | 701/119 |
| 2013/0282264 A1* | 10/2013 | Bastiaensen | G01C 21/3492 | 701/119 |
| 2013/0325306 A1* | 12/2013 | Caveney | B60W 30/0953 | 701/117 |
| 2014/0139670 A1* | 5/2014 | Kesavan | G06K 9/00791 | 348/148 |
| 2014/0207325 A1* | 7/2014 | Mudalige | B62D 15/025 | 701/26 |
| 2014/0358321 A1* | 12/2014 | Ibrahim | G01S 19/39 | 701/1 |
| 2014/0358414 A1* | 12/2014 | Ibrahim | G01C 21/10 | 701/118 |

* cited by examiner

| | $\Delta x_0$ | $y_0$ | $v_{x0}$ | $v_{y0}$ | $a_{x0}$ | $a_{y0}$ | $v_s$ | $y_s$ |
|---|---|---|---|---|---|---|---|---|
| scenario 1 | 50 | 0 | 20 | 0 | 0 | 0 | 18 | 0 |
| scenario 2 | 50 | 0 | 20 | 0 | 0 | 0 | 10 | 0 |
| scenario 3 | 50 | 0 | 20 | 0 | 0 | 0 | 5 | 0 |

Fig. 9

| $y_{max} = 7.5$ | $y_{min} = -2.5$ | $v_{y_{max}} = 5$ m/s |
|---|---|---|
| $v_{y_{min}} = -5$ m/s | $a_{x_{max}} = 1$ m/s$^2$ | $a_{x_{min}} = -4$ m/s$^2$ |
| $a_{x_{max}} = 2$m/s$^2$ | $a_{y_{min}} = -2$m/s$^2$ | $\Delta a_{x_{max}} = 1.5$m/s$^2$ |
| $\Delta a_{x_{min}} = -3$m/s$^2$ | $\Delta a_{y_{max}} = 0.5$m/s$^2$ | $\Delta a_{y_{min}} = -0.5$m/s$^2$ |
| $\theta_f = 2$ s | $\theta_r = 1$ s | $L_c = 5$ m |
| $W_L = 5$ m | $W_c = 2.5$ m | $\sigma_l = 5$ |
| $h = 0.1$ | $\varsigma = 2L_f$ | $\psi = 2.5$ |

Fig. 10

|   | No. 1 | No. 2 | No. 3 | No. 4 |
|---|---|---|---|---|
| $\alpha$ | $f_{a_1}$ | $f_{a_2}$ | 1 | $f_{a_4}$ |
| $\beta$ | 50 | 50 | 0.5 | 40 |
| $\gamma$ | 100 | 100 | 1 | 40 |
| $\nu$ | 1 | 1 | 0.5 | 0.5 |
| $\varrho$ | 1 | 1 | 0.5 | 0.5 |
| $\Upsilon$ | 300 | 0 | $\triangle x$ | NA |
| $\Phi$ | NA | NA | $-\triangle x$ | NA |
| $\Psi$ | 100 | 50 | NA | NA |
| $\Omega$ | NA | NA | NA | NA |
| $\Lambda$ | NA | 50 | NA | NA |
| $\Theta$ | NA | 25 | NA | NA |
| $\Gamma$ | NA | NA | NA | NA |
| $\chi$ | NA | NA | NA | 10000 |
| $\Xi$ | NA | NA | NA | 10000 |

Fig. 11

MANOEUVER GENERATION FOR AUTOMATED DRIVING

CROSS-REFERENCE TO RELATED APPLICATIONS

This application claims foreign priority benefits under 35 U.S.C. §119(a)-(d) to European patent application number EP 13184034.0, filed Sep. 12, 2013, which is incorporated herein by reference in its entirety.

TECHNICAL FIELD

Embodiments herein relate to an arrangement for manoeuvre generation for automated driving on a one-way road of a vehicle hosting the arrangement.

Further embodiments herein relate to a method for manoeuvre generation for automated driving on a one-way road of a vehicle hosting the arrangement.

Still further embodiments herein relate to a motor vehicle comprising an arrangement for manoeuvre generation for automated driving on a one-way road of a vehicle hosting the arrangement.

BACKGROUND

One area of automotive vehicle control where a high level of autonomy is both desirable and realizable is when travelling on one way roads. During vehicle travel on one way roads (e.g. highways) a high percentage of traffic accidents and fatalities are related to the human factor in lane change and overtake manoeuvres.

Thus, advanced driver assistance systems (ADAS) or fully automated systems for these types of manoeuvres are of great interest.

Manoeuvre generation with respect to surrounding vehicles can be viewed as an obstacle avoidance problem. Obstacle avoidance is a part of dynamic path planning since a collision free trajectory is crucial for performance.

Several methods for handling the obstacle avoidance problem have been proposed, where the most common include grid/graph based search, and relative velocity and distance based cost functions or conditions.

In grid/graph based search methods such as e.g. A*, D*, and rapidly exploring random trees (RRT), grid cells or graph nodes are assigned obstacle dependent cost, thus allowing the algorithm to find collision free trajectories. However, the algorithms can require significant computer memory and the efficiency of the algorithms is heavily dependent on the heuristics used.

Cost functions or constraints based on the distance and relative velocity to obstacles are commonly used due to their straightforwardness and simplicity. By either adding a cost term that increases when obstacles are in close proximity and the risk of collision is imminent or as a constraint on e.g. minimum distance allowed to obstacles, collision free trajectories can be achieved.

However, these types of cost terms or constraints are normally non-linear and/or non-convex, thus providing no guarantee of generating an optimal solution.

Although the above mentioned approaches for obstacle avoidance does give good results in a number of applications they also come with various drawbacks where the main drawback is the trade-off between required computational resources and solution optimality.

SUMMARY

Embodiments herein aim to provide an improved arrangement for manoeuvre generation for automated driving on a one-way road of a vehicle hosting the arrangement, the host vehicle further comprising one or more advanced driver assistance systems.

This is provided through an arrangement comprising: a controller arranged to repeatedly, with a fix time interval, determine a collision free reference trajectory for longitudinal and lateral movement of the host vehicle allowing the host vehicle to retain a desired velocity and maintain the host vehicle in a preferred lane utilizing model predictive control and quadratic program formulation; the controller further being arranged to utilize a control scheme where the structured environment of the one-way road is exploited in order to linearly formulate collision avoidance constraints, the controller further being arranged to perform the manoeuvre generation through the solution of the quadratic program, the controller further being arranged to control the one or more advanced driver assistance systems to perform the generated manoeuvre.

Utilizing model predictive control and quadratic program formulation a computational efficient arrangement that allows for collision free trajectories to be planned over a significant prediction horizon while accounting for system constraints is provided, which as such can be regarded as a step towards automated drive, providing a high-level control scheme that can utilize the low-level control capabilities of other advanced driver assistance systems (ADAS) such as adaptive cruise control (ACC) and lane keeping aid (LKA).

According to a second aspect the controller is arranged to determine the collision free reference trajectory for longitudinal and lateral movement of the host vehicle through solving an optimization problem minimizing a path performance index subject to host vehicle dynamics, convenience/comfort constraints and safety constraints.

The controller being arranged to account for host vehicle dynamics, convenience/comfort constraints and safety constraints provides for improved planning of collision free trajectories.

According to a third aspect a set of difference equations is used to model the host vehicle dynamics relative to its surrounding vehicles in a road aligned coordinate frame.

The provision of a set of difference equations is used to model the host vehicle dynamics provides for a computational efficient vehicle model.

According to a fourth aspect a set of convenience/comfort constraints is enforced, for ensuring determination of convenient and smooth trajectories for longitudinal and lateral movement of the host vehicle.

Enforcing of the set of convenience/comfort constraints ensures determination of convenient and smooth trajectories for longitudinal and lateral movement of the host vehicle.

According to a fifth aspect a set of collision constraints for ensuring that the host vehicle is restricted to stay outside safety critical regions is used, which set includes one or more of: a requirement that the vehicle stays on the road; Forward Collision Constraints; and Rear Collision Constraints.

The provision of the set of collision constraints ensures that the host vehicle is restricted to stay outside safety critical regions.

According to a sixth aspect the one or more advanced driver assistance systems (ADAS), comprises at least one of an adaptive cruise control (ACC) and a lane keeping aid (LKA) system, with the actuators and sensor arrangements normally associated with these systems.

The provision of at least one of an adaptive cruise control (ACC) and a lane keeping aid (LKA) system, with the associated actuators and sensor arrangements provides for the execution of the generated path by the low-level control modules of existing advanced driver assistance systems, resulting in a system with automated drive capability.

According to a seventh aspect a motor vehicle is provided which comprises an arrangement for manoeuvre generation, as described herein.

A motor vehicle comprising an arrangement for manoeuvre generation, as described herein, will provide improved safety through ensuring that collision free trajectories can be planned and executed.

According to an eight aspect is further provided a method for manoeuvre generation for automated driving on a one-way road of a vehicle hosting the arrangement, the host vehicle further comprising one or more advanced driver assistance systems.

This is provided through a method comprising the steps of: repeatedly, with a fix time interval, determining a collision free reference trajectory for longitudinal and lateral movement of the host vehicle allowing the host vehicle to retain a desired velocity and maintain the host vehicle in a preferred lane utilizing model predictive control and quadratic program formulation; utilizing a control scheme where the structured environment of the one-way road is exploited in order to linearly formulate collision avoidance constraints, performing the manoeuvre generation through solving the quadratic program, controlling the one or more advanced driver assistance systems to perform the generated manoeuvre.

Utilizing model predictive control and quadratic program formulation a computational efficient method that allows for collision free trajectories to be planned over a significant prediction horizon while accounting for system constraints is provided, which as such can be regarded as a step towards automated drive, providing a high-level control scheme that can utilize the low-level control capabilities of other advanced driver assistance systems (ADAS) such as adaptive cruise control (ACC) and lane keeping aid (LKA).

BRIEF DESCRIPTION OF THE DRAWINGS

In the following, embodiments herein will be described in greater detail by way of example only with reference to attached drawings, in which

FIG. 9 is a schematic illustration of TABLE I: Containing initial conditions for three considered scenarios, and $\Delta x_0$ denotes the relative longitudinal position [m] and, $v_{x_0}$, $v_s$ are the velocities [m/s].

FIG. 10 is a schematic illustration of TABLE II: Containing general design parameters for a decision and control algorithm.

FIG. 11 is a schematic illustration of TABLE III: Containing design parameters for the decision and control algorithm using approach 1-4.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and various and alternative forms are possible. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
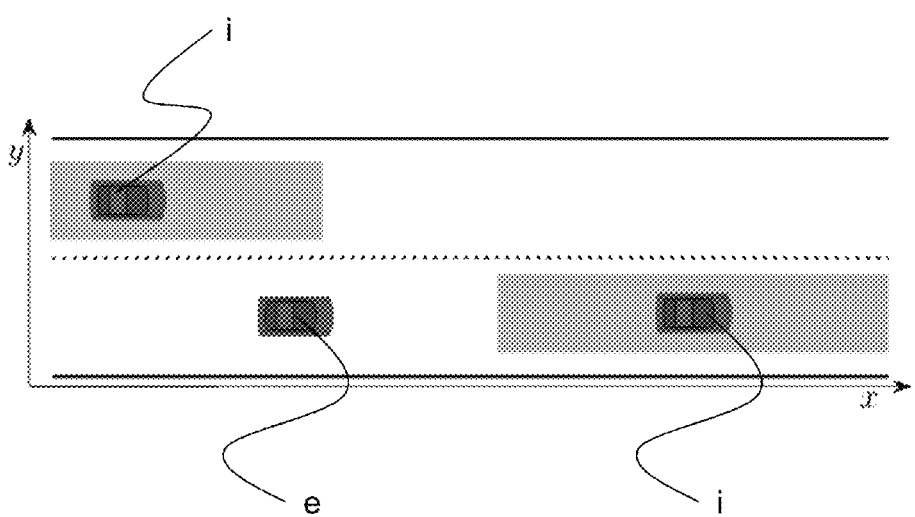
FIG. 1 is a schematic illustration of a host and surrounding vehicles travelling on a road with two lanes where the shaded areas around the surrounding vehicles indicate safety critical regions which the host vehicle should not enter.

FIG. 1 is a schematic illustration of vehicles travelling on a one-way road having two lanes, a host vehicle e and two additional vehicles i. The shaded boxes around the surrounding vehicles i indicate safety critical regions which the host vehicle e should not enter.

For simplicity only two lane one-way roads will be considered in the following description. However, the teachings provided herein may be expanded to consider roads having more lanes, without loss of generality.

Consider the scenario shown in FIG. 1. In the illustrated scenario, there is one vehicle i in front of the host vehicle e and another vehicle i in the adjacent lane. In this situation, the host vehicle e could either adjust its speed to the preceding vehicle i or accelerate and overtake the preceding vehicle i, passing in front of the preceding vehicle i in the adjacent lane, or perhaps wait until the vehicle i in the adjacent lane passes before performing the manoeuvre of overtaking the preceding vehicle i.

For a human driver, the choice of which manoeuvre to perform might be the result of balancing factors like having to adjust to the (relative) velocities of the surrounding vehicles i and the effort and safety risks associated with the alternative manoeuvres.

In the following will be described a computational efficient method that allows for collision free trajectories to be planned over a significant prediction horizon while accounting for system constraints.

As follows, the decision making and path planning problem for automated driving on a one-way road is considered as a model predictive control (MPC) problem formulated as a quadratic program (QP).

Further, the structured environment of one-way roads is exploited in order to linearly formulate the collision avoidance constraints. This is very beneficial since within the MPC framework, collision avoidance constraints often result in problems of prohibitive computational complexity e.g. due to mixed-integer inequalities.

The proposed problem formulation thus allows for a decision and control scheme for fast predictive manoeuvre generation through the solution of a QP. This high-level controller will at each time instance provide a reference trajectory for the longitudinal and lateral vehicle movement, all in purpose of allowing the host vehicle e to retain its desired velocity and maintain the host vehicle e in a preferred lane while avoiding collision with other vehicles i.

The controller may include a microprocessor, microcontroller, programmable digital signal processor or another programmable device. The controller may also, or instead, include an application specific integrated circuit, a programmable gate array or programmable array logic, a programmable logic device, or a digital signal processor. Where the controller includes a programmable device such as the microprocessor, microcontroller or programmable digital signal processor mentioned above, the processor may further include computer executable code that controls operation of the programmable device for performing the functions or operations described herein.

In the following the path planning problem will be formulated as an optimization problem, that is, the problem of finding a path that minimizes a performance index (1a), while obeying restrictions set by the vehicle dynamics (1b), maintaining a convenient ride through convenience constraints (1c) as well as ensuring that the host vehicle e stays on a safe collision free path through safety constraints (1d). This problem is repeatedly solved with a fix time interval.

This path planning optimization problem is considered as a high level control scheme similar to the decision making process of a human driver. The execution of the generated path can be a achieved by the low-level control modules of existing advanced driver assistance systems (ADAS), e.g. adaptive cruise control (ACC) and lane keeping aid (LKA), resulting in a system with automated drive capability.

The system can as such be regarded as a step towards automated drive, providing a high-level control scheme that can utilize the low-level control capabilities of other ADAS such as ACC and LKA.

Figure 2:
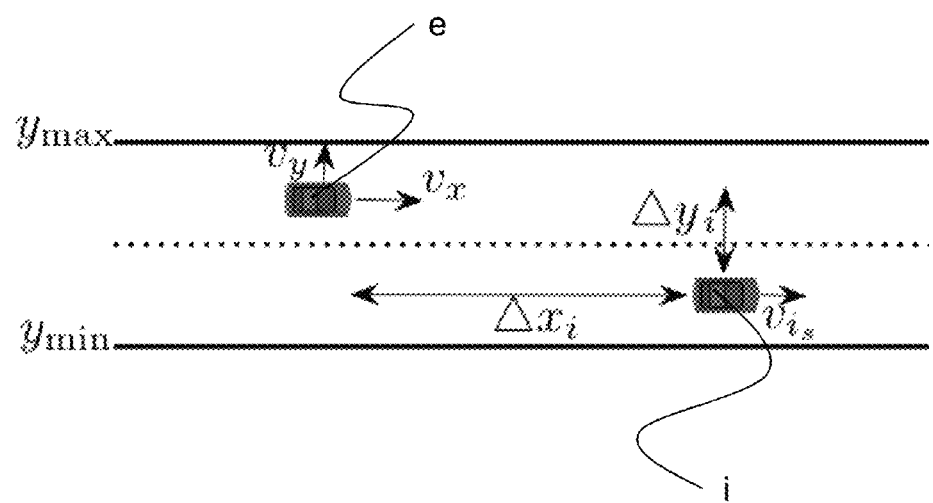
FIG. 2 is a schematic illustration of a scenario setup and notations.

Consider the notation introduced in FIG. 2, which illustrates a scenario setup and notations where the host vehicle is designated e and the surrounding vehicle i. The following set of difference equations is used to model the host vehicle's motion, vehicle dynamics (1b), relative to its surrounding vehicles in a road aligned coordinate frame at a specific time instance k.

The longitudinal distance $\Delta x_{i_k}$ between the surrounding vehicle i and the host vehicle e, i.e. along the x-axis, at the specific time instance k is calculated as a sum of the longitudinal distance $\Delta x_{i_{k-1}}$ at the previous time instance k−1 and a difference between the surrounding vehicle i longitudinal velocity $v_{i_s}$ at the sampling instance k multiplied with the sampling time h and the host vehicle e longitudinal velocity $v_{x_{k-1}}$ at the previous time instance k−1 multiplied with the sampling time h.

$$\Delta x_{i_k} = \Delta x_{i_{k-1}} + v_{i_s}h - v_{x_{k-1}}h \tag{2a}$$

The lateral position $y_k$ of the host vehicle e at the specific time instance k is calculated as a sum of the lateral position $y_{k-1}$ of the host vehicle e at the previous time instance k−1 and the host vehicle e lateral velocity $v_{y_k}$ at the sampling instance k multiplied with the sampling time h.

$$y_k = y_{k-1} + v_{y_k}h \tag{2b}$$

The longitudinal velocity $v_{x_k}$ of the host vehicle e at the specific time instance k is calculated as the longitudinal velocity $v_{x_{k-1}}$ of the host vehicle e at the previous time instance k−1 and the longitudinal acceleration $a_{x_k}$ of the host vehicle e at the sampling instance k multiplied with the sampling time h.

$$v_{x_k} = v_{x_{k-1}} + a_{x_k}h \tag{2c}$$

The lateral velocity $v_{y_k}$ of the host vehicle e at the specific time instance k is calculated as the lateral velocity $v_{y_{k-1}}$ of the host vehicle e at the previous time instance k−1 and the lateral acceleration $a_{y_k}$ of the host vehicle e at the sampling instance k multiplied with the sampling time h.

$$v_{y_k} = v_{y_{k-1}} + a_{y_k}h \tag{2d}$$

As illustrated above the lateral position, longitudinal velocity, lateral velocity, longitudinal acceleration, and lateral acceleration of the host vehicle e, are respectively denoted by y, $v_x$, $v_y$, $a_x$, and $a_y$. The longitudinal velocity of surrounding vehicle i is denoted by $v_{i_s}$, and $\Delta x_i = (x_{i_s} - x_e)$ denote distance between surrounding vehicle i and the host vehicle e along the x-axis.

As well known a car is a nonholonomic system, i.e. its position in a cartesian coordinate system is determined by the followed path. Hence, a target position can be reached if a feasible path connecting the initial and the target positions exists. On the other hand, the lateral and longitudinal positions in equations (2) are independent, i.e. not subject to the nonholonomic constraints observed in cars. For instance, $a_x=0$; $a_y \neq 0$ would generate a lateral movement, at a constant longitudinal velocity, that is infeasible for a real car. Nevertheless, equations (2) can generate a path in a cartesian coordinate system that can be followed by a car, by limiting the slip angle of the vehicle defined as $$\kappa = \arctan\frac{v_y}{v_x}.$$

In particular, by assuming $|\kappa| \leq 10°$ ($\approx 0.17$ rad) small angle approximation leads to $$-0.17 v_{x_k} \leq v_{y_k} \leq 0.17 v_{x_k}$$

To ensure that no inconvenient or non-smooth paths are planned, the following comfort constraints are enforced.

The longitudinal velocity $v_{x_k}$ of the host vehicle e at the specific time instance k is restricted between zero and a specified reference longitudinal velocity $v_{ref}$.

$$0 \leq v_{x_k} \leq v_{ref} \tag{3a}$$

The lateral velocity $v_{y_k}$ of the host vehicle e at the specific time instance k is restricted between a minimum lateral velocity $v_{y_{min}}$ and a maximum lateral velocity $v_{y_{max}}$ $$v_{y_{min}} \leq v_{y_k} \leq v_{y_{max}} \tag{3b}$$

The longitudinal acceleration $a_{x_k}$ of the host vehicle e at the sampling instance k is restricted between a minimum longitudinal acceleration $a_{x_{min}}$ and a maximum longitudinal acceleration $a_{x_{max}}$.

$$a_{x_{min}} \leq a_{x_k} \leq a_{x_{max}} \tag{3c}$$

The lateral acceleration $a_{y_k}$ of the host vehicle e at the sampling instance k is restricted between a minimum lateral acceleration $a_{y_{min}}$ and a maximum lateral acceleration $a_{y_{max}}$ $$a_{y_{min}} \leq a_{y_k} \leq a_{y_{max}} \tag{3d}$$

The difference between the longitudinal acceleration of the host vehicle e at the sampling instance k and the longitudinal acceleration $\Delta a_{x_k}$ of the host vehicle e at the previous time instance k−1 is restricted between a minimum longitudinal acceleration difference $\Delta a_{x_{min}}$ and a maximum longitudinal acceleration difference $\Delta a_{x_{max}}$.

$$\Delta a_{x_{min}} \leq \Delta a_{x_k} \leq \Delta a_{x_{max}} \quad (3e).$$

The difference between the lateral acceleration of the host vehicle e at the sampling instance k and the lateral acceleration of the host vehicle e at the previous time instance k−1 is restricted between a minimum lateral acceleration difference $\Delta a_{y_{min}}$ and a maximum lateral acceleration difference $\Delta a_{y_{max}}$.

$$\Delta a_{y_{min}} \leq \Delta a_{y_k} \leq \Delta a_{y_{max}} \quad (3f).$$

The above conditions (3b)-(3f) ensure that the planned manoeuvre confines within the boundaries of the assumed low-level modules for longitudinal and lateral control.

By confiding within the operating regions of smooth and comfortable manoeuvres i.e. not safety critical scenarios, a point mass model is sufficient for the considered operating region.

The requirements that the host vehicle e stays on the road at a collision free path, i.e. safety constraints, will now be introduced.

The requirement that the host vehicle e stays on the road is formulated as a restriction of the lateral position $y_k$ of the host vehicle e at the specific time instance k. Thus, the lateral position $y_k$ of the host vehicle e at the specific time instance k is restricted between a minimum lateral position $y_{min}$ and a maximum lateral position $y_{max}$ $$y_{min} \leq y_k \leq y_{max} \quad (4)$$

By restricting the host vehicle e to stay outside safety critical regions, as illustrated in FIG. 1, it is possible to ensure that the host vehicle e stays on a collision free path. However, as clearly indicated in FIG. 1, the area outside such regions is non-convex. In order to keep the planning problem within the quadratic programming framework, the safety constraints may be expressed as linear inequality constraints.

We introduce the Forward Collision Constraint (FCC) as the sum of a fist quota plus/minus a second quota, which sum should be less or equal to one.

$$\frac{\Delta x_{i_k}}{L_f} \pm \frac{\Delta y_{i_k}}{W} \geq 1 \quad (5)$$

The first quota is a quota between the longitudinal distance $\Delta x_{i_k}$ between the surrounding vehicle and the host vehicle e at the specific time instance k and a sum $L_f$ of the longitudinal velocity $v_x$ of the host vehicle e at the specific time instance k multiplied with a desired time gap $\theta_f$ to the vehicle in front i and a longitudinal length $L_c$ of the surrounding vehicle i, i.e. a quota between the longitudinal distance $\Delta x_{i_k}$ between the surrounding vehicle i and the host vehicle e at the specific time instance k and a sum of a desired distance $v_x\theta_f$ to the vehicle in front i at the specific time instance k and a longitudinal length $L_c$ of the surrounding vehicle i.

$$L_f = v_x\theta_f + L_c$$

The second quota is a quota between the lateral distance $\Delta y_{i_k}$ between the surrounding vehicle and the host vehicle e at the specific time instance k and a sum W of half the lane width $\tfrac{1}{2}W_L$ and the width $W_c$ of the surrounding vehicle i.

$$W = \tfrac{1}{2}W_L + W_c$$

The sign of the second term in the sum of the first and second quotas (5) depends on which lane the surrounding vehicle i is in, plus (+) if the surrounding vehicle i is in the left lane, and minus (−) if the surrounding vehicle i is in the right lane.

Figure 3:
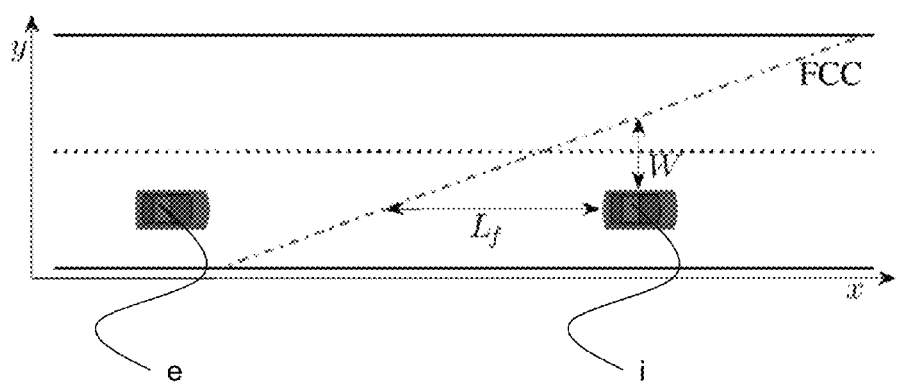
FIG. 3 is a schematic illustration of a Forward Collision Constraint enforced for a surrounding vehicle in the same lane as the host vehicle.

The FCC for a surrounding vehicle i in the same lane as the host vehicle e is illustrated in FIG. 3.

Similarly, the Rear Collision Constraints (RCC) are introduced as the sum of a third quota plus/minus a fourth quota, which sum should be less or equal to minus one.

$$\frac{\Delta x_{i_k}}{L_r} \pm \frac{\Delta y_{i_k}}{W} \leq -1 \quad (6)$$

The third quota is a quota between the longitudinal distance $\Delta x_{i_k}$ between the surrounding vehicle i and the host vehicle e at the specific time instance k and a sum of the longitudinal velocity $v_x$ of the host vehicle e at the specific time instance k multiplied with a desired time $\theta_r$ gap to the vehicle behind i and a longitudinal length $L_c$ of the surrounding vehicle i, i.e. a quota between the longitudinal distance $\Delta x_{i_k}$ between the surrounding vehicle i and the host vehicle e at the specific time instance k and a sum of a desired distance $v_x\theta_r$ to the vehicle behind i at the specific time instance k and a longitudinal length $L_c$ of the surrounding vehicle i.

$$L_r = v_x\theta_r + L_c$$

The fourth quota is the quota between the lateral distance $\Delta y_{i_k}$ between the surrounding vehicle i and the host vehicle e at the specific time instance k and a sum of half the lane width $\tfrac{1}{2}W_L$ and the width $W_c$ of the surrounding vehicle i.

$$W = \tfrac{1}{2}W_L + W_c$$

The sign of the second term in the sum of the third and fourth quotas depends on which lane the surrounding vehicle i is in, minus (−) if the surrounding vehicle i is in the left lane, and plus (+) if the surrounding vehicle i is in the right lane.

Figure 4:
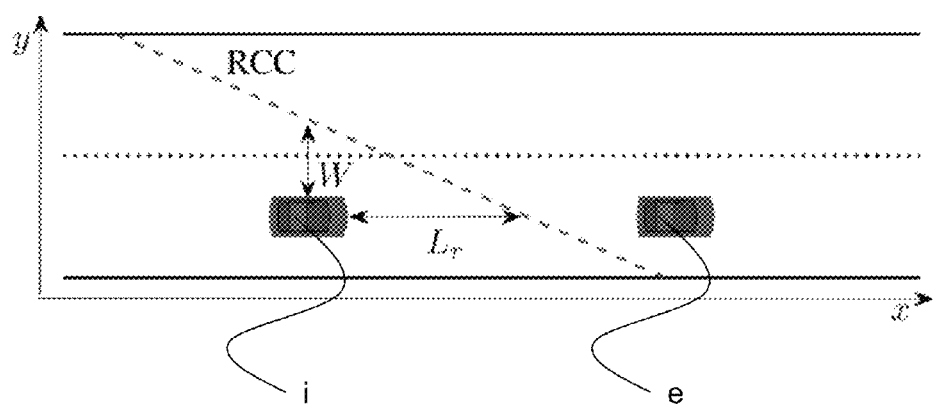
FIG. 4 is a schematic illustration of a Rear Collision Constraint enforced for a surrounding vehicle in the same lane as the host vehicle.

The RCC for a surrounding vehicle i in the same lane as the host vehicle e is illustrated in FIG. 4.

Figure 5:
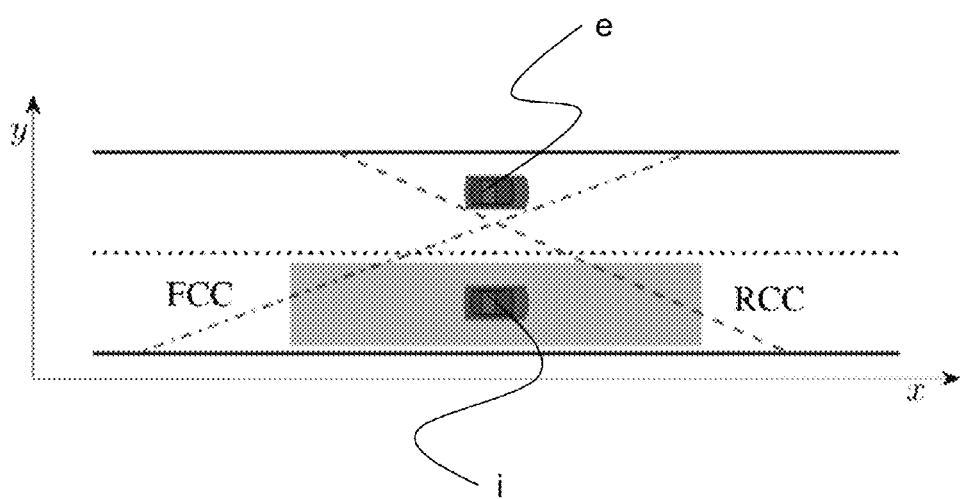
FIG. 5 is a schematic illustration of a bounded risk area (shaded) approximated by the Forward Collision Constraint and Rear Collision Constraint simultaneously enforced.

In FIG. 5, the FCC and RCC are simultaneously illustrated with a bounded risk area (shaded) approximated by the FCC and RCC simultaneously enforced. We note that when both constraints are active the host vehicle e is only allowed to be positioned in this small area adjacent to the surrounding vehicle i. In principle, we would only like the FCC to be active when the host vehicle e is behind the surrounding vehicle i and the RCC to be active when the host vehicle e is in front of the surrounding vehicle i.

The collision constraints are therefore rewritten as follows.

The Forward Collision Constraint (FCC) is rewritten as the sum of the first quota plus/minus the second quota plus a forward shifting factor, which sum should be less or equal to one (7). The forward shifting factor should be limited between zero and a maximum value. This can be expressed as:

$$\frac{\Delta x_k}{L_f} \pm \frac{\Delta y_k}{W} + \varepsilon_{x_{fk}} \geq 1 \qquad (7)$$

where $0 \leq \varepsilon_{x_{fk}} \leq \varepsilon_{x_{fmax}}$ and,

The Rear Collision Constraints (RCC) are rewritten as the sum of a third quota plus/minus a fourth quota plus a rearward shifting factor, which sum should be less or equal to minus one (8). The rearward shifting factor should be limited between a minimum value and zero. This can be expressed as:

$$\frac{\Delta x_k}{L_r} \pm \frac{\Delta y_k}{W} + \varepsilon_{x_{rk}} \leq -1 \qquad (8)$$

where $\varepsilon_{x_{rmin}} \leq \varepsilon_{x_{rk}} \leq 0$

A positive value of the forward shifting factor $\varepsilon_{x_{fk}}$ shifts FCC to the right in FIG. 3, which illustrates the FCC enforced for a surrounding vehicle i in the same lane as the host vehicle e, and similarly a negative value of the rearward shifting factor $\varepsilon_{x_{rk}}$ shifts RCC to the left in FIG. 4, which illustrates the RCC enforced for a surrounding vehicle i in the same lane as the host vehicle e, thus allowing for the collision constraints to be relaxed.

In the following, the quadratic programming (QP) problem will be formulated and different approaches for formulating the activation and deactivation of the collision constraints will be presented. Without loss of generality, for clarity only one surrounding vehicle i positioned in the right hand lane will be considered.

In model predictive control (MPC), at every time instance t the following finite time, constrained optimal control problem is formulated and solved, Assuming that w belongs to $\mathbb{R}^n$ space. Both w and f are column vectors with n elements and H is a symmetric n×n matrix.

$$\min_w J = \tfrac{1}{2} w^T H w + f^T w \qquad (9a)$$

which is minimized with respect to w subject to one or more constraints of the form:

$$Gw = K_{eq} \text{(equality constraint)} \qquad (9b)$$

$$Dw \leq K_{ineq} \text{(inequality constraint)} \qquad (9c)$$

Where $w^T$ indicates the vector transpose of w. The notation $Dw \leq K_{ineq}$ means that every entry of the vector Dw is less than or equal to the corresponding entry of the vector $K_{ineq}$ and $w \triangleq [U_t, Z_t]$ where $U_t \triangleq [u_t^T, \ldots, u_{t+Hp-1}^T]^T$ is the solution to the problem i.e. optimal control input sequence, $Z_t \triangleq [z_{t+}^T, \ldots, z_{t+Hp}^T]^T$ are the states of the system, and Hp denotes the prediction horizon. The problem (9) is solved in receding horizon i.e at every time instance t the problem is formulated and solved based on the current state z(t) over a shifted time horizon.

In the following a performance index is introduced.

Temporarily ignoring the safety constraints, the MPC problem for maintaining the host vehicle e at the centerline of its preferred lane, $y_{ref}$ and travelling at a desired velocity $v_{x_{des}}$, while avoiding collisions with the j-th surrounding vehicle (j=1, : : : , q) keeping the host vehicle e within the road boundaries, and fulfilling the host vehicle's e physical and design constraints.

can thus be formulated in QP form as in (9) with:

$$w = [\Delta x_k \ y_k \ v_{x_k} \ v_{y_k} \ a_{x_k} \ a_{y_k} \ v_s \ y_s] \ (k=1, \ldots, Hp)$$

and the cost function for retaining a reference velocity while allowing smooth ride comfort for the host vehicle e designed as $$J_0 = \sum_{k=0}^{Hp-1} \alpha(v_{x_k} - v_{x_{des}})^2 + \beta(y_k - y_{ref})^2 + \gamma v_{y_k}^2 + \upsilon a_{x_k}^2 + \rho a_{y_k}^2 \qquad (10)$$

where $\alpha$, $\beta$, $\gamma$, $\upsilon$ and $\rho$ are positive scalar weights. The objective of travelling at a desired velocity $v_{x_{des}}$, is achieved by the $\alpha(v_{x_k} - v_{x_{des}})^2$ term, while the $\beta(y_k - y_{ref})^2$ term satisfies the objective of maintaining the host vehicle e at the centerline of its preferred lane, $y_{ref}$, and implies a cost associated with a lane change manoeuvre, whereas the $\gamma v_{y_k}^2$; $\upsilon a_{x_k}^2$; and $\rho a_{y_k}^2$ terms allow for ride comfort. Further the presented vehicle model is included in the problem formulations by letting (9b) correspond to the system dynamics i.e. (2), and (9c) correspond to the system constraints i.e. (3)-(4).

The signals $v_{i_s}$ and $y_{i_s}$ are treated as measurable exogenous disturbance signals. Such measurements can be obtained using e.g. a doppler radar, such as commonly provided by advanced driver assistance systems (ADAS) such as adaptive cruise control (ACC) systems. Further, it is assumed that all surrounding vehicles i are travelling at constant velocity and that they do not change their lane position over the prediction horizon. However, it is to be noted that a more advanced model the surroundings may be included in the framework of the present disclosure, which is thus not limited to the above assumption.

The presented approaches for formulating the safety constraints are included in (9) by incorporating respective cost function i.e. performance index in (9a) and constraints in (9c).

To maintain problem convexity only two lanes are considered. However, without loss of generality, more lanes can be considered by formulating and solving several QPs.

In a first approach the cost function for enabling appropriate activation and deactivation of (7) and (8), i.e. determine when $\varepsilon_{x_{fk}}$ and $\varepsilon_{x_{rk}}$ assumes non-zero value, is defined as:

$$J_1 = J_0 + \sum_{k=0}^{Hp-1} \gamma \varepsilon_{x_{fk}} - \Phi \varepsilon_{x_{rk}} + \Psi \Delta x_k \varepsilon_{x_{fk}} + \Omega \Delta x_k \varepsilon_{x_{rk}} \qquad (11)$$

where Y, $\Phi$, $\Psi$ and $\Omega$ are positive scalar weights.

By including the terms $\Delta x_k \varepsilon_{x_{fk}}$ and $\Delta x_k \varepsilon_{x_{rk}}$ in the cost function (11), $\varepsilon_{x_{fk}}$ and $\varepsilon_{x_{rk}}$ will be assigned values depending on the sign of $\Delta x_k$. Although, the cost of assuming a nonzero value depends on $\Delta x_k$ there is no guarantee that in some situations, the slack variables will not assume a nonzero value and thereby affecting the constraints in an undesirable manner.

This risk can be reduced by appropriately weighting the variables (Y, $\Phi$) in the cost function.

However, even though this formulation can be written as a QP, the formulation is not convex since the terms $\Delta x_k \varepsilon_{x_{fk}}$ (and $\Delta x_k \varepsilon_{x_{rk}}$ if included) renders H in (9) to not be positive semi-definite.

In a second approach, in order to compensate for the negative eigenvalues of H caused by the $\Delta x_k \varepsilon_{x_{fk}}$ and $\Delta x_k \varepsilon_{x_{rk}}$, it is necessary to include $\Delta x_k^2$, $\varepsilon_{x_{fk}}^2$ and $\varepsilon_{x_{rk}}^2$ in the cost function. This allows the collision avoidance constraints to be written as in (7)-(8) while keeping the problem formulation convex by setting:

$$J_2 = J_0 = \sum_{k=0}^{H_p-1} \gamma \varepsilon_{x_{fk}} - \Phi \varepsilon_{x_{rk}} + \quad (12)$$

$$\Psi \Delta x_k \varepsilon_{x_{fk}} + \Omega \Delta x_k \varepsilon_{x_{rk}} + \Lambda \Delta x_k^2 + \Theta \varepsilon_{x_{fk}}^2 + \Gamma \varepsilon_{x_{rk}}^2$$

where $Y$, $\Phi$, $\Psi$, $\Omega$, $\Lambda$, $\Theta$ and $\Gamma$ are positive scalar weights.

However, the problem that the slack variables will assume a non-zero value irrespective of the sign of $\Delta x$, and thereby affecting the constraints in an undesirable manner remains. Also, by introducing $\Delta x_k^2$, $\varepsilon_{x_{fk}}^2$ and $\varepsilon_{x_{rk}}^2$ in $J_2$, there is a high cost associated with overtaking and driving away from a slower moving vehicle i. The high cost can cause undesirable behaviour in that the host vehicle e adapts to the velocity of the overtaken vehicle i rather than maintaining its desired reference velocity, once the overtake manoeuvre has been performed. This problem can be reduced by removing the constraint once the overtaking manoeuvre has actually been performed, but the problem still remains in the optimization over the prediction horizon.

As described in the second approach, including the terms $\Delta x_k \varepsilon_{x_{fk}}, \Delta x_k \varepsilon_{x_{rk}}, \Delta x_k^2, \varepsilon_{x_{fk}}^2$ and $\varepsilon_{x_{rk}}^2$ in $J_2$ (12) provides a convex QP formulation of the collision avoidance problem. However, the approach has some limitations and thus a third approach for formulating the problem is suggested.

In this third approach the terms $\Delta x_k \varepsilon_{x_{fk}}$, $\Delta x_k \varepsilon_{x_{rk}}, \Delta x_k^2, \varepsilon_{x_{fk}}^2$ and $\varepsilon_{x_{rk}}^2$ are removed from $J_2$ (12) and the following conditions are instead imposed $$0 \leq \Delta x_k + \zeta \varepsilon_{x_{fk}}$$

$$0 \geq \Delta x_k + \zeta \varepsilon_{x_{rk}} \quad (13)$$

where $\zeta$ is a positive constant.

By penalizing $\varepsilon_{x_{fk}}$ and $\varepsilon_{x_{rk}}$ these slack variables should not be assigned non-zero values unless required to fulfil condition (13) and thereby only affect the collision avoidance constraints ((7), (8)), when appropriate.

A challenge with this approach is in weighting the cost of $\varepsilon_{x_{fk}}$ and $\varepsilon_{x_{rk}}$ so that these variables will not take a non-zero value when undesirable but still not be to costly for the constraint (13) to be satisfied when $|\Delta x_k|$ is large.

An approach to overcome this difficulty is by utilizing the replanning nature of the MPC methodology, and fix the weights $(Y, \Phi)$ of $\varepsilon_{x_{fk}}$ and $\varepsilon_{x_{rk}}$ proportional to $\Delta x$ before each optimization cycle.

In order to provide collision avoidance, if in fact a collision free trajectory exists, the collision avoidance constraints should be robust. As mentioned in approaches 1-3, a main problem when introducing slack variables is to weight them appropriately in the optimization cost function. Since an optimal or even satisfactory weighting can be difficult to achieve for general scenarios, a possible fourth approach is to allow the slack variables associated to the forward collision avoidance constraint to adopt a positive value if and only if the host vehicle e has either changed lanes or passed the surrounding vehicle i. Then the FCC becomes $$\frac{\Delta x_k}{L_f} - \frac{\Delta y_k}{W} + \delta \varepsilon_{x_{fk}} + \frac{\varepsilon_{y_{fk}}}{\varphi_f} + \varepsilon_{fk} \geq 1 \quad (14)$$

where the parameters $$\delta = -\Delta x$$

$$\varphi_f = \min(\psi, |\Delta x|)$$

are all set before, and kept constant, at each optimization cycle, and $\varepsilon_{y_{fk}} = \Delta y_k - \sigma_l$, $\varepsilon_{fk} \geq 0$. Hence $\varepsilon_{x_{fk}}$ will only relax the constraint if the host vehicle e has passed the overtaken vehicle i. Likewise, $\varepsilon_{y_{fk}} \geq 0$ if $\Delta y \geq \sigma_l$, and the slack variable $\varepsilon_{y_{fk}}$ will only positively relax the FFC if the host vehicle e has changed lane ($\sigma_l$, denotes the left lane center). The slack variable $\varepsilon_{fk}$ is penalized heavily in the cost function and will thus only affect condition (14) if no other feasible options exist. Why $\varphi_f$ is set as $\varphi_f = \min(\psi, |\Delta x|)$, ($\psi \geq 0$), is in order to reduce the impact of $\varepsilon_{y_{fk}} \leq 0$ when $|\Delta x|$ is large.

The main drawback of formulating the forward collision constraint in this manner, is that during an optimization cycle a full overtake manoeuvre can never be achieved. This is because over the prediction horizon, the constraint is only softened when the host vehicle e is in the adjacent lane. Thus, only when the host vehicle e has actually passed the surrounding vehicle i can the constraint be removed (i.e. $\varepsilon_{y_{fk}} \geq 0$) and the host vehicle e is allowed to return to its original lane.

The main advantage is that forward collisions may be avoided if a collision free trajectory actually exists.

The RCC can be formulated as $$\frac{\Delta x_k}{L_r} + \frac{\Delta y_k}{W} - \delta \varepsilon_{x_{rk}} + \varepsilon_{rk} \leq -1 \quad (15)$$

where $\varepsilon_{rk} \leq 0$.

The cost function for this approach is set as $$J_4 = J_0 - \Sigma_{k=0}^{N-1} \chi \varepsilon_{fk}^2 + \Xi \varepsilon_{rk}^2 \quad (16)$$

where $\chi$ and $\Xi$ are positive scalar weights.

The above four approaches for decision making and collision free path planning where implemented as an optimization problem according to (9) with corresponding cost function and constraints for each approach using Matlab.

In order to investigate the performance of the different approaches for the considered traffic situation of the host vehicle e driving on a straight two-lane, one-way road with one other vehicle i present, three scenarios are considered:

The host vehicle e is approaching the surrounding vehicle i which is travelling at a velocity just below the host vehicle's reference velocity.

The host vehicle e is approaching the surrounding vehicle i which is travelling at a velocity below the host vehicle's reference velocity.

The host vehicle e is approaching the surrounding vehicle i which is travelling at a velocity much below the host vehicle's reference velocity.

For all scenarios it is assumed that the host vehicle e initially travels at its reference velocity ($v_{ref} = 20$ m/s) in the right lane, and that the surrounding vehicle i is travelling at constant velocity in the right lane throughout the simulation.

For each of the described scenarios the respective initial conditions are given in Table I.

The general design parameters for the decision and control algorithm (9) are given in Table II and the design parameters for each approach is given in Table III where $$f_{a_1} = \min\left(\frac{|v_{ref} - v_0|^5}{10}, 300\right) + 0.5 \quad (17)$$

$$f_{a_2} = |v_{ref} - v_0|^5 + 0.5$$

-continued $$f_{a_4} = \min\left(\frac{|v_{ref} - v_0|^5}{10}, 50\right) + 0.5$$

These weight functions (17) are a result of parameter tuning and allow the cost contribution of the host vehicle's velocity to be limited when the relative velocities are large, thus allowing deceleration when appropriate as in scenario 2 and 3. Another aspect of (17) is that the velocity weight will still be significant when the relative velocity is small thus bringing the host vehicle e forward. The parameter values not given in Tables II-III are considered unbounded.

It is to be noted that the weight functions (17) as well as other parameter values are solely provided for this example and may be chosen differently without altering the model concept or algorithm.

Please note that for approach 1 and 2, the RCC (8) where not included in the simulation since the problem of selecting appropriate weights is much complicated by the fact that conditions (7)-(8) leads to conflicting terms (i.e. $\Psi \Delta x_k \epsilon_{x_{fk}} + \Omega \Delta x_k \epsilon_{x_{rk}}$) in (11). This conflict is thus resolved by removing the RCC ((8)) and corresponding terms in (11). Removing the RCC might be considered quite controversial. However, by increasing the weight Y, the distance where to deactivate the FFC can be determined and thus allowing the host vehicle e to return to its original lane once the overtaken vehicle i has been passed.

Figure 6:
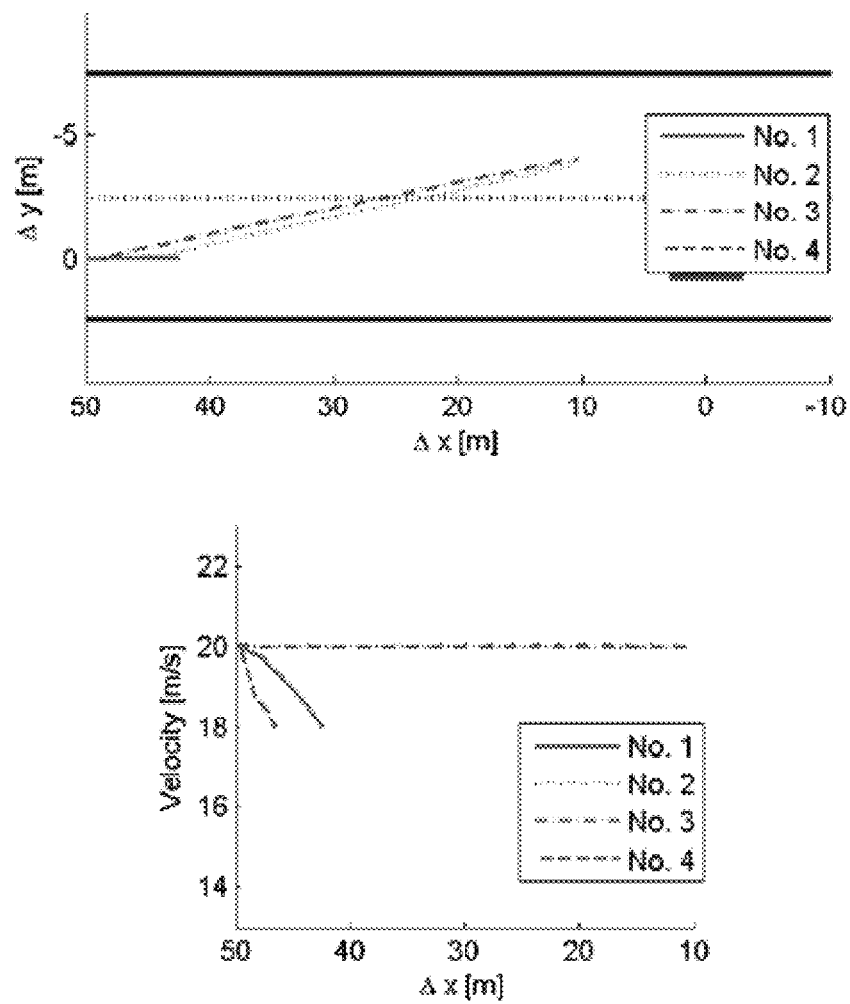
FIG. 6 is a schematic illustration of a relative position trajectory of the host and surrounding vehicle, as well as the velocity profile of the host vehicle for a first scenario.
Figure 7:
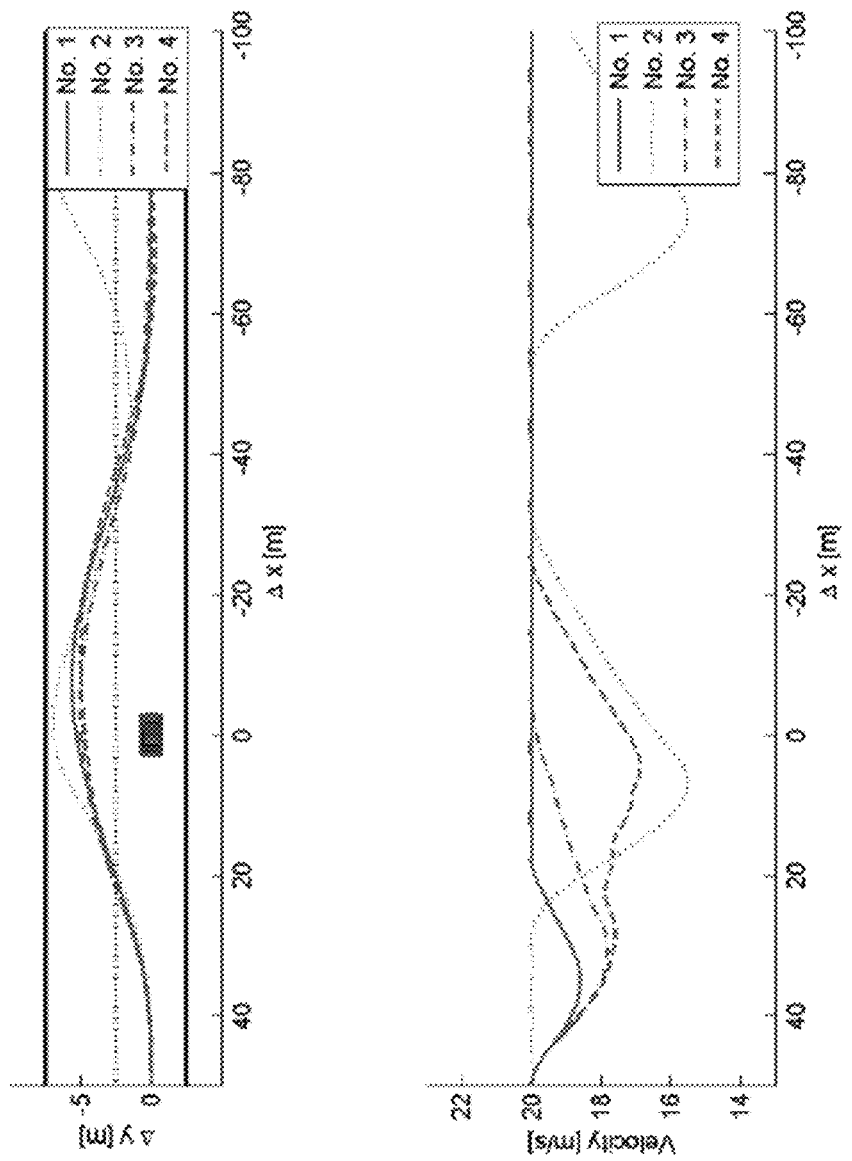
FIG. 7 is a schematic illustration of a relative position trajectory of the host and surrounding vehicle, as well as the velocity profile of the host vehicle for a second scenario.
Figure 8:
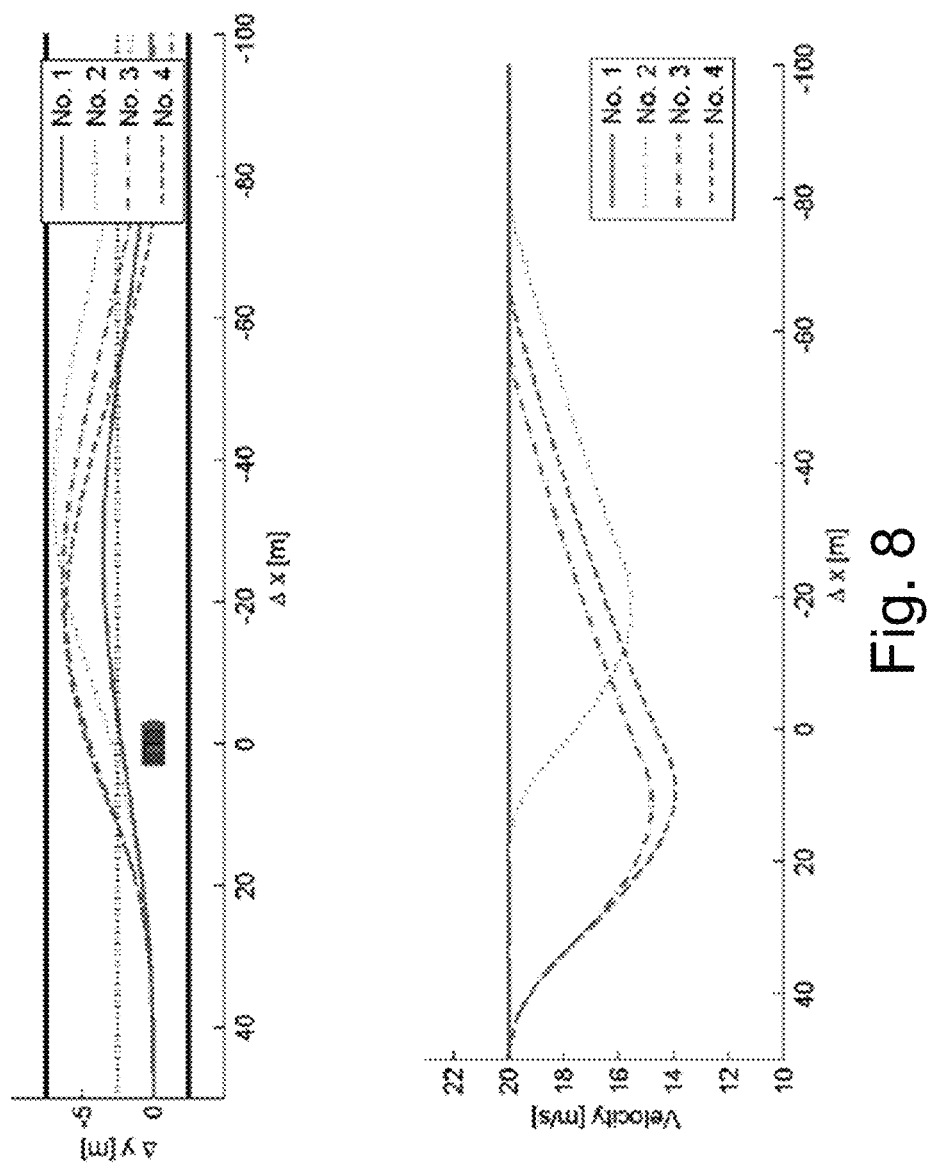
FIG. 8 is a schematic illustration of a relative position trajectory of the host and surrounding vehicle, as well as the velocity profile of the host vehicle for a third scenario.

In FIGS. 6-8 the relative position trajectory of the host vehicle e and surrounding vehicle i, as well as the velocity profile of the host vehicle e are shown for all four approaches in each of the three scenarios. For scenario 1 in FIG. 6 which illustrates the relative position trajectory of the host vehicle e and surrounding vehicle i as well as the velocity profile of the host vehicle e for the first scenario, it can be seen that for approach 1 and 4 the host vehicle e adjusts its velocity to the surrounding vehicle i and follows it in the right lane rather than initializing an overtake manoeuvre, as is the case for approach 2 and 3.

Why the overtake manoeuvre is performed in approach 2 can be explained as a consequence of the $\Delta x_k^2$ term in (12) and thus the overtake manoeuvre will be initialized independent of the relative velocity of the host vehicle e and surrounding vehicle. As to why or why not an overtake manoeuvre is initialized for approaches 1, 3, and 4, this is a consequence of the design parameters which are chosen to get as satisfying result as possible for many different scenario settings.

For scenario 2 all approaches results in an overtake manoeuvre, without violating the collision avoidance constraints. Noteworthy is the behaviour resulting from approach 2 where the host vehicle e showcase oscillatory lane change behaviour and velocity profile as consequence of the squared terms in (12), see FIG. 7 which illustrates the relative position trajectory of the host vehicle e and surrounding vehicle i, as well as the velocity profile of the host vehicle e for the second scenario.

When the relative velocity is further increased in scenario 3, shown in FIG. 8 which illustrates the relative position trajectory of the host vehicle e and surrounding vehicle i, as well as the velocity profile of the host vehicle e for the third scenario, only approach 3 and 4 results in an appropriate manoeuvre, i.e. reducing the velocity of the host vehicle e in order to perform an overtaking manoeuvre while keeping safe distance to the surrounding vehicle i. This scenario displays the importance of selecting appropriate design parameters and formulate constraints that are only relaxed when appropriate.

Thus, presented above is a high-level control scheme for fast predictive manoeuvre generation for automated driving. Utilizing the structured environment of one-way roads, collision avoidance constraints have been linearly formulated, allowing the path planning problem to be solved as a QP. Four approaches to formulating the safety constraints have been discussed and although interesting as an introduction to the complexity of formulating decision making and path planning with collision avoidance constraints as a QP, approach 1 and 2 have been shown by simulation and reasoning not to give satisfying results.

However, approach number 3 provides a scheme that with appropriately weighted design parameters results in suitable manoeuvre generation. Further, approach number 4 has likewise shown promising results as well as being able to provide collision avoidance if a collision free trajectory exits that satisfies the system constraints.

Thus, hereby is envisaged an arrangement for manoeuvre generation for automated driving on a one-way road of a vehicle e hosting the arrangement, the host vehicle e further comprising one or more advanced driver assistance systems. The arrangement comprises: a controller arranged to repeatedly, with a fix time interval, determine a collision free reference trajectory for longitudinal and lateral movement of the host vehicle e allowing the host vehicle e to retain a desired velocity and maintain the host vehicle e in a preferred lane utilizing model predictive control and quadratic program formulation. The controller is further arranged to utilize a control scheme where the structured environment of the one-way road is exploited in order to linearly formulate collision avoidance constraints. The controller is still further arranged to perform the manoeuvre generation through the solution of the quadratic program and to control the one or more advanced driver assistance systems to perform the generated manoeuvre.

In embodiments hereof the controller is arranged to determine the collision free reference trajectory for longitudinal and lateral movement of the host vehicle e through solving an optimization problem minimizing a path performance index 1a subject to host vehicle e dynamics 1b, convenience/comfort constraints 1c and safety constraints 1d.

In further embodiments hereof a set of difference equations 2a-2d is used to model the host vehicle e dynamics 1b relative to its surrounding vehicles i in a road aligned coordinate frame.

In yet further embodiments hereof a set of convenience/comfort constraints 3a-3f is enforced, for ensuring determination of convenient and smooth trajectories for longitudinal and lateral movement of the host vehicle e.

In still further embodiments hereof a set of collision constraints for ensuring that the host vehicle e is restricted to stay outside safety critical regions is used, which set includes one or more of: a requirement that the vehicle stays on the road 4; Forward Collision Constraints 5, 7; and Rear Collision Constraints 6, 8.

In embodiments hereof the one or more advanced driver assistance systems (ADAS), comprises at least one of an adaptive cruise control (ACC) and a lane keeping aid (LKA) system, with the actuators and sensor arrangements normally associated with these systems, such as one or more of a radar sensor, a laser sensor, a lidar sensor, an ultrasound sensor, an infrared sensor, an image sensor, or any combination thereof According to the present application is also envisaged a motor vehicle that comprises an arrangement for manoeuvre generation for automated driving on a one-way road of a vehicle (e) hosting the arrangement, as described herein.

Further, according to the present application is also envisaged a method for manoeuvre generation for automated driving on a one-way road of a vehicle (e) hosting the arrangement, the host vehicle (e) further comprising one or more advanced driver assistance systems, where the method comprises the steps of: repeatedly, with a fix time interval, determining a collision free reference trajectory for longitudinal and lateral movement of the host vehicle (e) allowing the host vehicle (e) to retain a desired velocity and maintain the host vehicle e in a preferred lane utilizing model predictive control and quadratic program formulation; utilizing a control scheme where the structured environment of the one-way road is exploited in order to linearly formulate collision avoidance constraints, performing the manoeuvre generation through solving the quadratic program, controlling the one or more advanced driver assistance systems to perform the generated manoeuvre.

Although the above description only describes two lane one-way roads, the teachings provided herein may, without loss of generality, be expanded to consider roads having more lanes through formulating and solving several quadratic programs.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure.

What is claimed is:

1. An arrangement for maneuver generation for automated driving on a one-way road of a vehicle (e) hosting the arrangement, the host vehicle (e) comprising one or more advanced driver assistance systems, the arrangement comprising:

a controller configured to repeatedly determine a collision free reference trajectory for longitudinal and lateral movement of the host vehicle (e) allowing the host vehicle (e) to retain a desired velocity and maintain the host vehicle (e) in a preferred lane of a road utilizing model predictive control formulated as a quadratic program;

a communications interface for providing communication between the controller and the one or more advanced driver assistance systems;

the controller further being configured to utilize a control scheme where a structured environment of the one-way road is exploited in order to linearly formulate collision avoidance constraints;

the controller further being configured to perform the maneuver generation through solution of the quadratic program, the controller further being configured to control the one or more advanced driver assistance systems to perform the generated maneuver.

2. The arrangement according to claim 1 wherein the controller is configured to determine the collision free reference trajectory for longitudinal and lateral movement of the host vehicle (e) through solving an optimization problem minimizing a path performance index subject to dynamics of the host vehicle (e), convenience/comfort constraints and safety constraints.

3. The arrangement according to claim 2, wherein the controller is configured to use a set of difference equations to model the host vehicle (e) dynamics relative to surrounding vehicles (i) in a road aligned coordinate frame.

4. The arrangement according to claim 2, wherein the controller is configured to use a set of convenience/comfort constraints for determination of convenient and smooth trajectories for longitudinal and lateral movement of the host vehicle (e).

5. The arrangement according to claim 1, wherein the controller is configured to use a set of collision constraints to ensure the host vehicle (e) is restricted to stay outside safety critical regions, which set includes one or more of a requirement that the vehicle stays on the road, forward collision constraints, and rear collision constraints.

6. The arrangement according to claim 1 wherein the one or more advanced driver assistance systems, comprises at least one of an adaptive cruise control and a lane keeping aid system, including actuators and sensors associated therewith.

7. An arrangement for maneuver generation for automated driving of a vehicle on a one-way road, the arrangement comprising:

a host vehicle (e) comprising one or more advanced driver assistance systems:

a controller configure to repeatedly determine a collision free reference trajectory for longitudinal and lateral movement of the host vehicle (e) allowing the host vehicle (e) to retain a desired velocity and maintain the host vehicle (e) in a preferred lane of a road utilizing model predictive control formulated as a quadratic program;

a communications interface for providing communication between the controller and the one or more advanced driver assistance systems:

the controller further being configured to utilize a control scheme where a structured environment of the one-way road is exploited in order to linearly formulate collision avoidance constraints:

the controller further being configured to perform the maneuver generation through solution of the quadratic program, the controller further being configured to control the one or more advanced driver assistance systems to perform the generated maneuver.

8. A method for maneuver generation for automated driving on a one-way road of a host vehicle (e) comprising one or more advanced driver assistance systems and a controller, the method comprising:
- repeatedly determining, by the controller, a collision free reference trajectory for longitudinal and lateral movement of the host vehicle (e) allowing the host vehicle (e) to retain a desired velocity and maintain the host vehicle (e) in a preferred lane utilizing model predictive control formulated as a quadratic program;
- utilizing, by the controller, a control scheme where the structured environment of the one-way road is exploited in order to linearly formulate collision avoidance constraints;
- performing the maneuver generation through the controller solving the quadratic program; and
- controlling the one or more advanced driver assistance systems to perform the generated maneuver.

9. The arrangement according to claim 2 wherein the controller is configured to use a set of difference equations to model the host vehicle (e) dynamics relative to surrounding vehicles (i) in a road aligned coordinate frame, the set of difference equations comprising:

$$\Delta x_{i_k} = \Delta x_{i_{k-1}} + v_{i_s} h - v_{x_{k-1}} h;$$

$$y_k = y_{k-1} + v_{y_k} h;$$

$$v_{x_k} = v_{x_{k-1}} + a_{x_k} h;\text{ and}$$

$$v_{y_k} = v_{y_{k-1}} + a_{y_k} h;$$

wherein,
- $\Delta x_{i_k}$ is a longitudinal distance between a surrounding vehicle i and the host vehicle e at a time instance k;
- $\Delta x_{i_{k-1}}$ is a longitudinal distance between the surrounding vehicle i and the host vehicle e at a previous time instance k−1;
- $v_{i_s}$ is a longitudinal velocity of the surrounding vehicle i at the instance k;
- h is a sampling time;
- $v_{x_{k-1}}$ is a longitudinal velocity of the host vehicle e at the previous instance k −1;
- $y_k$ is a lateral position of the host vehicle e at the time instance k;
- $y_{k-1}$ is a lateral position of the host vehicle e at the time instance k−1;
- $v_{y_k}$ is a lateral position of the host vehicle e at the previous instance k;
- $v_{x_k}$ is a longitudinal velocity of the host vehicle e at the instance k;
- $v_{i_{k-1}}$ is a longitudinal velocity of the host vehicle e at the previous instance k −1;
- $a_{x_k}$ is a longitudinal acceleration of the host vehicle e at the instance k;
- $v_{y_k}$ is a lateral velocity of the host vehicle e at the instance k;
- $v_{y_{k-1}}$ is a lateral velocity of the host vehicle e at the previous instance k −1; and
- $a_{y_k}$ is a lateral acceleration of the host vehicle e at the sampling instance k.

10. The arrangement according to claim 2 wherein the controller is configured to use a set of convenience/comfort constraints for determination of convenient and smooth trajectories for longitudinal and lateral movement of the host vehicle (e), the set of convenience/comfort constraints comprising:

(a) $0 \leq v_{x_k} \leq v_{ref}$, wherein $v_{x_k}$ is a longitudinal velocity of the host vehicle e at a specific time instance k, and $v_{ref}$ is a specified reference longitudinal velocity;

(b) $v_{y_{min}} \leq v_{y_k} \leq v_{y_{max}}$, wherein $v_{y_k}$ is a lateral velocity of the host vehicle e at the instance k, $v_{y_{min}}$ is a minimum lateral velocity, and $v_{y_{max}}$ is a maximum lateral velocity;

(c) $a_{x_{min}} \leq a_{x_k} \leq a_{x_{max}}$, wherein $a_{x_k}$ is a longitudinal acceleration of the host vehicle e at the instance k, $a_{x_{min}}$ is a minimum longitudinal acceleration, and $a_{x_{max}}$ is a maximum longitudinal acceleration;

(d) $a_{y_{min}} \leq a_{y_k} \leq a_{y_{max}}$, wherein $a_{y_k}$ is a lateral acceleration of the host vehicle e at the instance k, $a_{y_{min}}$ is a minimum lateral acceleration, and $a_{y_{max}}$ is a maximum lateral acceleration;

(e) $\Delta a_{x_{min}} \leq \Delta a_{x_k} \leq \Delta a_{x_{max}}$, wherein $\Delta a_{x_k}$ is a difference between a longitudinal acceleration of the host vehicle e at the instance k and a longitudinal acceleration of the host vehicle e at a previous time instance k−1, $\Delta a_{x_{min}}$ is a minimum longitudinal acceleration difference, and $\Delta a_{x_{max}}$ is a maximum longitudinal acceleration difference; and (f) $\Delta a_{y_{min}} \leq \Delta a_{y_k} \leq \Delta a_{y_{max}}$, wherein $\Delta a_{y_k}$ is a difference between a lateral acceleration of the host vehicle e at the instance k and a lateral acceleration of the host vehicle e at the previous time instance k−1, $\Delta a_{y_{min}}$ is a minimum lateral acceleration difference, and $\Delta a_{y_{max}}$ is a maximum lateral acceleration difference.

11. The arrangement according to claim 1 wherein the controller is configured to use a set of collision constraints to ensure the host vehicle (e) is restricted to stay outside safety critical regions, which set includes one or more of:
- a requirement that the vehicle stays on the road formulated as $y_{min} \leq y_k \leq y_{max}$, wherein $y_k$ is a lateral position of the host vehicle e at a specific time instance k, $y_{min}$ is a minimum lateral position, and $y_{max}$ is a maximum lateral position;
- forward collision constraints $$\frac{\Delta xi_k}{L_f} \pm \frac{\Delta yi_k}{W} \geq 1 \text{ and } \frac{\Delta x_k}{L_f} \pm \frac{\Delta y_k}{W} + \varepsilon_{x_{fk}} \geq 1,$$

with $$L_f = v_x \theta_f + L_c, \quad W = \frac{1}{2}W_L + W_c, \text{ and } 0 \leq \varepsilon_{x_{fk}} \leq \varepsilon_{x_{fmax}},$$

wherein $\Delta x_{i_k}$ is a longitudinal distance between a surrounding vehicle i and the host vehicle e at a specific time instance k, $\Delta y_{i_k}$ is a lateral distance between a surrounding vehicle i and the host vehicle e at the instance k, $v_x$ is a longitudinal velocity of the host vehicle e at the instance k, $\theta_f$ is a desired time gap to a surrounding vehicle in front i, $L_c$ is a longitudinal length of the surrounding vehicle i, /1;2$W_L$ is half a lane width, $W_c$ is a width of the surrounding vehicle i, $\varepsilon_{x_{fk}}$ is a forward shifting factor, and $\varepsilon_{x_{fmax}}$ is a maximum forward shifting factor value; and rear collision constraints $$\frac{\Delta x i_k}{L_r} \pm \frac{\Delta y i_k}{W} \leq -1 \text{ and } \frac{\Delta x_k}{L_r} \pm \frac{\Delta y_k}{W} + \varepsilon_{x_{rk}} \leq -1,$$

with $$L_r = v_x \theta_r + L_c, \ W = \frac{1}{2} W_L + W_c, \text{ and } \varepsilon_{x_{r_{min}}} \leq \varepsilon_{x_{rk}} \leq 0,$$

wherein $\theta_r$ is a desired time gap to a surrounding vehicle behind i, $\epsilon_{x_{rk}}$ is a rearward shifting factor, and $\varepsilon_{x_{r_{min}}}$ is a minimum rearward shifting factor value.

* * * * *